Figure 1:
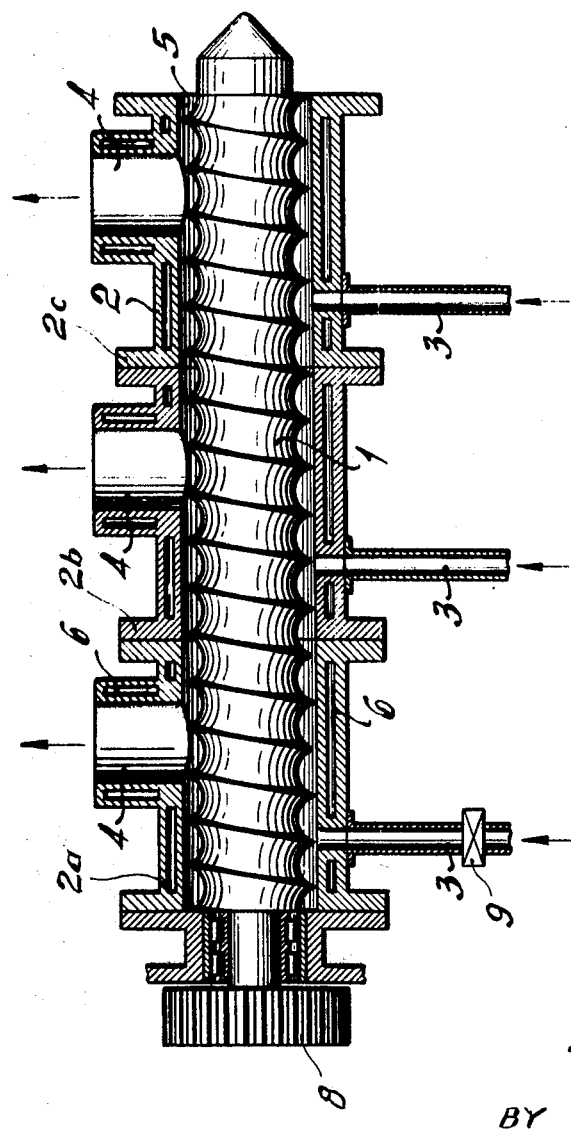

United States Patent

[11] 3,612,141

| [72] | Inventor | Herbert Ocker<br>Leonberg, Germany |
|---|---|---|
| [21] | Appl. No. | 798,197 |
| [22] | Filed | Feb. 10, 1969 |
| [45] | Patented | Oct. 12, 1971 |
| [73] | Assignee | Werner & Pfleiderer<br>Stuttgart-Feuerbach, Germany |
| [32] | Priority | Feb. 15, 1968 |
| [33] | | Germany |
| [31] | | P 17 19 453.5 |

[54] METHOD OF AND DEVICE FOR CONTINUOUSLY EXTRACTING A LIQUID COMPONENT CONTAINED IN A LIQUID
6 Claims, 2 Drawing Figs.

[52] U.S. Cl............................................... 159/2 E, 18/12
[51] Int. Cl............................................... B01d 1/28
[50] Field of Search................................. 159/2 E; 18/12 SN, 12 SG

[56] References Cited
UNITED STATES PATENTS

| 2,992,679 | 7/1961 | Twaddle...................... | 159/2 E |
| 3,022,271 | 2/1962 | Darr et al..................... | 260/96 |
| 3,023,456 | 3/1962 | Palfey........................... | 18/2 SF |
| 3,230,288 | 1/1966 | Henderson.................... | 264/176 |

FOREIGN PATENTS

| 84,183 | 10/1964 | France......................... | 18/2 SN |

Primary Examiner—Norman Yudkoff
Assistant Examiner—J. Sofer
Attorney—Hane & Baxley ABSTRACT: A volatile liquid component contained in a liquid is continuously extracted therefrom by volatilizing the component while the liquid is forced to flow through an elongate container. The liquid to be purified is fed into the container at lengthwise spaced points thereof and the volatilized component is removed from the container through ports at intermediate points thereof. The remaining liquid now liberated from the component is discharged at one end of the container. There is also disclosed a device for carrying out the method.

PATENTED OCT 12 1971

3,612,141

INVENTOR
HERBERT OCKER

BY Hane and Baxley

ATTORNEYS

METHOD OF AND DEVICE FOR CONTINUOUSLY EXTRACTING A LIQUID COMPONENT CONTAINED IN A LIQUID

The invention relates to a method of continuously extracting by volatilization a volatile liquid component contained in a liquid and more particularly to a method of extracting by volatilization a solvent contained in a solution of plastics material and similar materials such as polymerized solutions, partly polymerized solutions and nonpolymerized solutions and also suspensions the liquid component of which is to be volatilized in part or completely.

The invention also relates to a device for carrying out the method.

BACKGROUND

There are known devices for carrying out the method above referred to in which the solution to be treated is force fed through an elongate container constituting the treatment run and is volatilized while flowing through the container. The volatilized component is discharged from the container thereby liberating the synthetic plastics or other solution from the component. In devices as heretofore known, the entire flow of the liquid to be treated is continuously fed into the reaction container at the inlet end thereof and the nonvolatilized part of the liquid is discharged at the outlet end, if desired after additional treatment.

Volatilization and removal of the component by this conventional method has several disadvantages. Carrying out of the method requires expensive treatment devices, high-speed rotation of the conveyor screws in the container being generally necessary which entails expensive and complex bearings. The diameter and the length of the conveyor screws must be considerable. Moreover, the required rapid rotation of the conveyor screws causes automatically comparatively high shearing forces acting upon the material to be treated and such high shearing forces are undesirable as they tend to damage the material.

Is is a broad object of the invention to provide a novel and improved method of continuously extracting by volatilization a liquid component such as a solvent from a synthetic plastics solution which can be economically carried out, does not present operational difficulties and does not tend to cause damage to the material to be treated.

It is also a broad object of the invention to provide a novel and improved device for carrying out the method of the invention.

The afore pointed out objects, features and advantages and other objects, features and advantages which will be pointed out hereinafter and set forth in the appended claims are obtained by continuously feeding the solution to be treated into a treatment container at lengthwise spaced points thereof in the form of several partial flows rather than feeding the total flow into the container at the inlet end thereof as is heretofore conventional. It has been found to be particularly advantageous to effect volatilization and degassing of the solvent also by means of partial flows by withdrawing the volatilized solvent at lengthwise spaced points of the container.

A device for carrying out the method comprises in accordance with the invention an elongate container in which conveyor means such as conveyor screws force the liquid such as a synthetic plastics solution to flow toward a discharge port at one end of the container. Feeding of the solution into the container is effected through lengthwise spaced inlet ports in the container. It has been found particularly advantageous to associate each feed port with one or more degassing vents for discharging the vaporized component.

Depending upon the specific requirements of the material to be treated, conveyors in the form of mutually parallel and meshing screws may be used, or also single screw conveyors.

The method of the invention permits a considerable simplification of the treatment device and also a reduction of the manufacturing and operational costs thereof. The rotational speed of the conveyor screws may be lower than in comparable devices as heretofore known and the length and diameter of the screws may be smaller whereby less sophisticated bearings may be used. The degassing ports in the treatment container may be smaller. This in turn permits simplification of the construction of the container and thus of the costs thereof. The strength requirements for which the container must be designed depend to a large extent on the size of the required expansion dome and the construction of this dome is controlled to a large extent by the dimensions of the degassing ports.

By feeding the liquid to be treated as partial flows into the container at lengthwise spaced points thereof the filling level in the container can be maintained substantially equal over the entire length thereof. In devices as heretofore known, it occurs rather frequently that the degassing ports in the container are blocked by the formation of gas bubbles. This danger is avoided in the device according to the invention as the feeding of the total flow of the liquid is distributed over the length of the container due to the feeding of the liquid in the form of partial flows so that the liquid will automatically distribute itself within the container.

By using comparatively slowly rotating screws the shear forces acting upon the material are correspondingly reduced. This, in turn, results in more favorable temperature conditions in the liquid than were heretofore obtainable. Reduction of the shear forces and careful temperature control as essential for the qualities of may of the materials to be processed in devices of the kind therein referred to, for instance, viscous material will not more or less deteriorate when treated according to the method and in the device of the invention.

The partial flows of the material to be treated such as a synthetic plastics solution are preferably metered in accordance with the specific treatment requirements at the point at which a partial flow is fed into the container. Accordingly, the invention provides the provision of suitable metering or dosing devices associated with one or several feed ports for the material.

As a method of the invention facilitates the development of volatilization, gas velocities may occur in the degassing ports such that portions of the treatment material become entrained in the volatilized component. Loss of material due to such entrainment in the gas flow can be readily avoided by providing pressure control valves in the discharge conduits for the volatilized component and in the expansion dome.

Feeding of the partial flows of the material to be processed into the container may be effected from the bottom or top of the container, or laterally. If the material is fed under pressure into the container, pressure control valves of conventional design are preferably provided.

The container is preferably divided into several lengthwise aligned sections each of which communicates with one feed conduit and one or more discharge ports for the vaporized component.

The conveyor means in the container should be designed in accordance with specific requirements. The conveyor screws may for instance merely convey, or they may include mixing and kneading components; they may be solid or hollow. If several screws are used the screws may mesh and have self-cleaning meshing profiles. It is also possible to provide counter conveying screws or screw portions in the container.

It has been found that a device according to the invention can be uniformly loaded and thus fully utilized.

In the accompanying drawing a preferred embodiment of a device according to the invention is shown by way of illustration and not by way of limitation.

Figure 2:
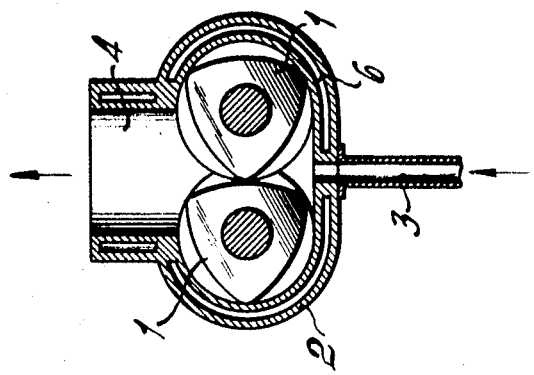

In the drawing:

FIG. 1 is a sectional lengthwise view of a device for carrying out the method of the invention, and FIG. 2 is a cross section of FIG. 1.

Referring now to the figures more in detail, the device comprises an elongate container or casing 2 in which two mutually parallel meshing conveyor screws 1 are rotatably supported.

The length of the casing constitutes the treatment run for the material. The casing may be a one-piece casing but it preferably comprises several suitably joined sections 2a, 2b and 2c.

The liquid to be treated such as a synthetic plastics solution is fed into the container through feed conduits 3 communicating with the casing at lengthwise spaced points thereof. Three conduits are shown but more or less than three conduits may be provided. The solution fed into the casing is force fed by screws 1 toward a discharge port 5. As is diagrammatically indicated at 8 drive means for the conveyor screws are provided at the opposite end of the casing. The drive means should be visualized as being conventional and the structure thereof does not constitute part of the invention.

Each feed conduit 3 is associated with at least one discharge degassing conduit 4. The discharge conduits may be designed in any suitable and conventional manner for instance, they may be in the form of expansion domes.

The temperature of the casing is maintained at the desired level by directing a flow of a heating medium or a coolant through ducts or passages 6 indicated in the casing wall.

The feed of the solution to be treated through conduits 3 may be metered or dosed in accordance with the specific requirements of the solution to be treated. A conventional metering device 9 is diagrammatically indicated for one of conduits 3.

As is now evident, the total volume of solution or other material to be treated is fed into the casing at several lengthwise spaced points thereof in contrast to the heretofore conventional method of feeding the entire volume of the solution into the casing at one point thereof.

The device may be an assembly in a larger structural unit or may constitute a self-contained installation.

What is claimed is:

1. A method of continuously extracting a volatile liquid component contained in a liquid, said method comprising the steps of:

providing an elongate treatment container having a discharge port at one end, and rotary conveyor screw means for conveying liquid to be treated within the container toward said discharge port thereof to effect volatilization of the volatile component contained in the liquid as the latter is being conveyed toward the discharge port of the container;

feeding the total volume of the liquid containing the volatile component in the form of several fractional flows into the container through axially spaced feed openings thereof;

discharging the volatilized components from the container through a number of discharge openings axially disposed along the container, equal in number to the feed openings, and each of said discharge openings being disposed downstream of a corresponding one of the feed openings;

2. A device for continuously extracting a volatile liquid component contained in a liquid, said device comprising in combination:

an elongate treatment container having a discharge port at one end;

rotary screw conveyor means within said container for force feeding liquid to be treated within the container toward said discharge port to effect volatilization of the volatile component contained in the liquid as the same as flowing through the container;

a plurality of feed conduits communicating with said container at axially spaced feed points thereof for feeding the total volume of the liquid through said conduits into the container in the form of several fractional flows; and discharge means for discharging the volatilized component from the container, said discharge means including discharge conduits separate from the feed conduits and communicating with said container at lengthwise spaced points thereof, each of said discharge points being associated with one of said feed points and located downstream of the respective one of said feed points, the liquid freed of the volatile component being discharged through said discharge port.

3. The device according to claim 2 wherein conveyor means comprises two mutually parallel meshing conveyor screws.

4. The device according to claim 2 and comprising metering means connected to at least one of said feed conduits for supplying a metered volume of liquid through the respective conduit.

5. The device according to claim 2 wherein said container is divided into lengthwise spaced sections.

6. The device according to claim 5 wherein one of said sections communicates with at least one of said feed conduits and at least one said discharge means.